United States Patent
Tomizawa

(10) Patent No.: US 11,214,315 B2
(45) Date of Patent: Jan. 4, 2022

(54) UNDERBODY STRUCTURE OF VEHICLE

(71) Applicant: Toyota Jidosha Kabushiki Kaisha, Toyota (JP)

(72) Inventor: Yoshihito Tomizawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/672,839

(22) Filed: Nov. 4, 2019

(65) Prior Publication Data

US 2020/0148276 A1  May 14, 2020

(30) Foreign Application Priority Data

Nov. 8, 2018 (JP) .............................. JP2018-210348

(51) Int. Cl.
  *B62D 25/20* (2006.01)
  *B62D 27/06* (2006.01)
  *B62D 21/15* (2006.01)

(52) U.S. Cl.
  CPC ............. *B62D 25/20* (2013.01); *B62D 27/06* (2013.01); *B62D 21/15* (2013.01)

(58) Field of Classification Search
  CPC ........ B62D 25/20; B62D 27/06; B62D 21/15; B62D 27/065
  USPC ....................................................... 296/204
  See application file for complete search history.

(56) References Cited

U.S. PATENT DOCUMENTS

| | | | | |
|---|---|---|---|---|
| 6,793,276 B2* | 9/2004 | Sugihara | ................ | B62D 21/10 296/1.03 |
| 7,014,256 B2* | 3/2006 | Kamura | ................. | B62D 25/20 296/1.03 |
| 8,567,857 B2* | 10/2013 | Fujii | .................... | B62D 21/157 296/204 |
| 8,925,991 B2* | 1/2015 | Caliskan | .............. | B62D 27/065 296/29 |
| 9,434,420 B1* | 9/2016 | Islam | ..................... | B62D 25/20 |
| 2009/0108633 A1* | 4/2009 | Ohi | .................... | B62D 25/2036 296/204 |
| 2010/0244486 A1 | 9/2010 | Yamaki | | |
| 2012/0019026 A1* | 1/2012 | Deng | ................. | B60N 2/42709 296/193.02 |
| 2018/0022396 A1* | 1/2018 | Nishida | .................. | B62D 25/20 296/204 |
| 2019/0233015 A1 | 8/2019 | Kasai | | |
| 2019/0291556 A1* | 9/2019 | Caliskan | ................. | B60L 50/64 |

FOREIGN PATENT DOCUMENTS

| | | |
|---|---|---|
| CN | 101844585 A | 9/2010 |
| CN | 110091928 A | 8/2019 |
| JP | 08-133131 A | 5/1996 |
| JP | 2004-314729 A | 11/2004 |
| JP | 2018-030513 A | 3/2018 |

* cited by examiner

*Primary Examiner* — Pinel E Romain
(74) *Attorney, Agent, or Firm* — Dinsmore & Shohl LLP

(57) ABSTRACT

A floor center member extends through a central part of a body floor of a vehicle and a longitudinal direction of the vehicle, and a first floor cross member penetrates the floor center member to extend in a lateral direction of the vehicle. The floor center member includes a coupling flange counter to a top wall of the first floor cross member. The coupling flange is coupled to the first floor cross member, by a bolt and a nut.

7 Claims, 3 Drawing Sheets

UNDERBODY STRUCTURE OF VEHICLE

CROSS REFERENCE TO RELATED APPLICATION

This application claims priority to Japanese Patent Application No. 2018-210348 filed on Nov. 8, 2018, which is incorporated herein by reference in its entirety including the specification, claims, drawings, and abstract.

TECHNICAL FIELD

The present disclosure relates to an underbody structure of a vehicle and particularly relates to coupling of skeletal members arranged on a body floor and crossing each other.

BACKGROUND

In an underbody structure of a vehicle, skeletal members are arranged on a body floor making up the floor of a cabin. The skeletal members include, for example, a floor center member extending through a central part of the body floor and along the longitudinal direction of the vehicle, and a floor cross member extending in the lateral direction of the vehicle to cross the floor center member.

JP 2018-30513 A describes a floor center member (center tunnel) (9) extending through a central part of a floor panel (3) and along the longitudinal direction of a vehicle, and a floor cross member (first cross member (19)) penetrating the floor center member (9) to extend in the lateral direction of the vehicle, the floor center member (9) and the floor cross member being described as skeletal members of an underbody structure of the vehicle. The above member names and signs in parentheses are member names and signs used in JP 2018-30513 A, and are not related to member names and signs used in the description of an embodiment of the present disclosure.

In an underbody structure of a vehicle, when skeletal members crossing each other are coupled, it is common practice to spot-weld sheet metals making up the skeletal members together. Spot-welding, however, shows weak resistance to a force that acts to separate welded members from each other.

The present disclosure is applied to effectively enhance a state of skeletal members of an underbody structure of a vehicle being coupled together.

SUMMARY

An underbody structure of a vehicle according to the present disclosure includes a floor center member disposed on a body floor of the vehicle, the floor center member extending through a central part of the body floor and along a longitudinal direction of the vehicle; and a floor cross member disposed on the body floor of the vehicle, the floor cross member penetrating the floor center member to extend in a lateral direction of the vehicle. The floor center member includes a coupling flange counter to a surface of the floor cross member, and the coupling flange is coupled to the floor cross member, by a fastening component.

Coupling the coupling flange to the floor cross member, by the fastening component, is effective for coupling the floor center member and the floor cross member firmly together.

The underbody structure of the vehicle further includes a seat anchor block disposed on a top face of the floor cross member, and a leg of the vehicle's seat is fixed to the seat anchor block. The floor center member may be coupled to the floor cross member, by the fastening component, at a location that is inside relative to the seat anchor block in the lateral direction of the vehicle.

By determining the location of coupling by the fastening component to be inside relative to the seat anchor block in the lateral direction of the vehicle, timing for attaching the seat anchor block can be determined, regardless of timing for fastening by the fastening component.

The fastening component may include a weld nut disposed on an inner surface of the floor cross member and a bolt that is screwed into the weld nut to couple the floor center member to the floor cross member. This allows the fastening by the fastening component even if accessing the interior of the floor cross member is impossible.

Coupling the floor center member to the floor cross member by the fastening component enhances a state of the floor center member and the floor cross member being coupled together, and is therefore effective for enhancing the strength of the body.

DESCRIPTION OF EMBODIMENT

An embodiment of the present disclosure will hereinafter be described with reference to drawings. In the following description, unless specified otherwise, phrases expressing relative positional relationships and directions, such as front, front side, rear, rear side, left, right, side, above, upper side, below, and lower side, define positional relationships and directions pertaining to a vehicle. The front-to-rear direction of the vehicle is defined as the longitudinal direction, the left-to-right direction of the same as the lateral direction, and the top-to-bottom direction of the same as the vertical direction. Further, in the lateral direction of the vehicle, a side closer to a central line extending in the longitudinal direction of the vehicle is defined as inside in the lateral direction of the vehicle, and a side farther from the same is defined as outside in the lateral direction of the vehicle. In each drawing, an arrow FR points toward the front side, an arrow UP points toward the upper side, and an arrow LH points toward the left side.

Figure 1:
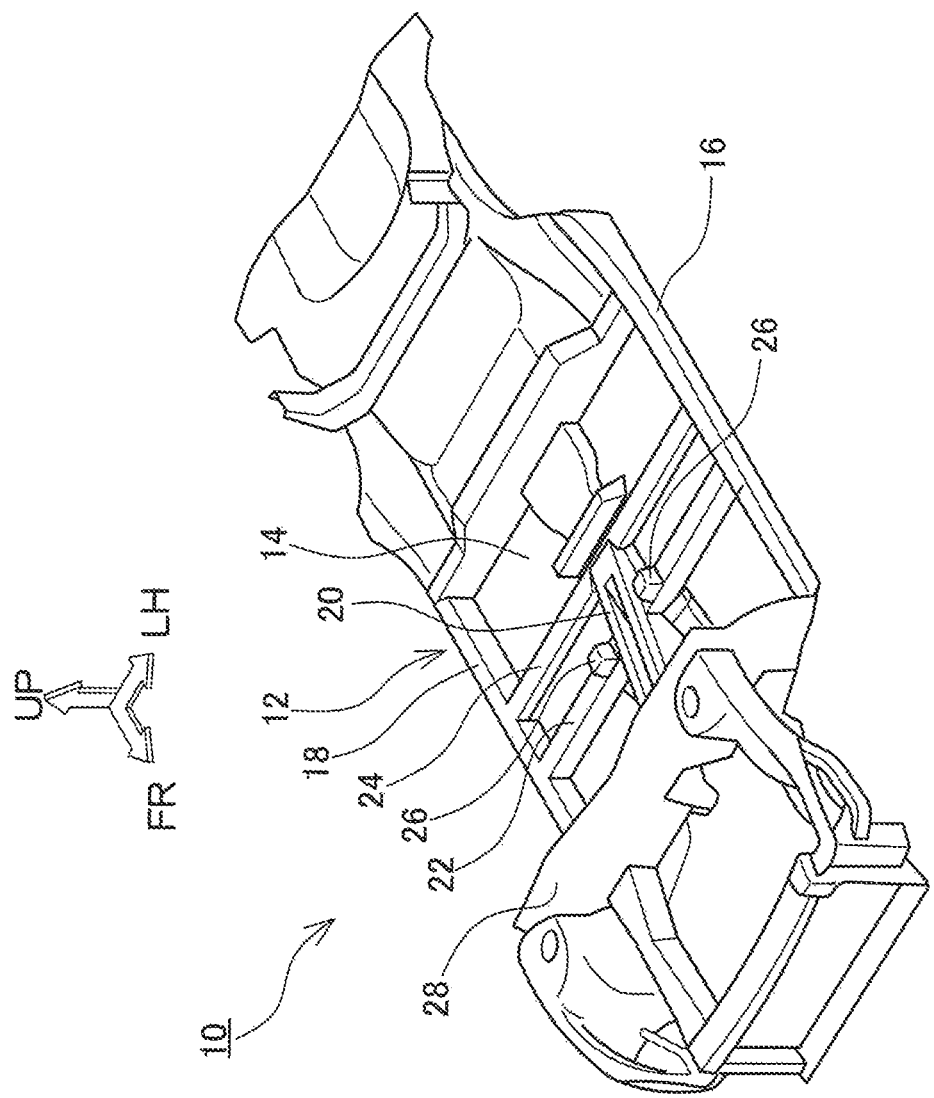
FIG. 1 is a perspective view of a schematic configuration of an underbody structure of a vehicle.

FIG. 1 is a perspective view of a schematic configuration of an underbody structure 10 of a vehicle. The underbody structure 10 includes a body floor 12 making up the floor of the cabin of the vehicle. The body floor 12 is formed basically by joining press-worked sheet metal elements together, by welding or the like. The body floor 12 has a floor panel 14 making up the bottom of the body floor 12, and floor skeletal members that are arranged on the floor panel 14 and that extend in the longitudinal direction or lateral direction of the vehicle. The floor skeletal members include rockers 16 and 18 extending in the longitudinal direction along left and right side edges of the body floor 12, a floor center member 20 extending in the longitudinal direction through a central part of the body floor 12, and floor cross members 22 and 24 extending in the lateral direction of the vehicle to connect the rocker 16 to the rocker 18. The two floor cross members 22 and 24 include one floor cross member located frontward, which is referred to as the first floor cross member 22, and the other located rearward, which is referred to as the second floor cross member 24. Each of the first and second floor cross members 22 and 24 has a section of an inverted U shape. When joined to the floor panel 14, therefore, each of the first and second floor cross members 22 and 24, in combination with the floor panel 14, forms a closed section of a polygonal shape, such as a rectangular closed section.

At locations on the first floor cross member 22, the locations being close to the floor center member 20 on both its sides, seat anchor blocks 26 are disposed, each of the seat anchor blocks 26 fixing a seat in the cabin. Each seat anchor block 26 serves as one fixing point at which a sheet track for sliding the seat in the longitudinal direction of the vehicle is fixed. Nuts (not depicted) are disposed on an upper surface of the seat anchor block 26, and bolts (not depicted) are screwed into the nuts to fix the sheet track.

The floor center member 20 extends rearward from a dash panel 28 to reach the second floor cross member 24, and has a top face sloped down toward the rear side. The top face of the floor center member 20 has a groove (recession) formed at its center in the lateral direction of the vehicle, and ridges extending in the longitudinal direction are formed on both sides across the groove formed at the center. A sectional shape formed by these groove and ridges increases the strength and rigidity of the floor center member 20, thus allowing the floor center member 20 to efficiently transmit an incoming collision load from the front side to the second floor cross member 24. The first floor cross member 22 penetrates the floor center member 20 to extend in the lateral direction of the vehicle. This structure is effective for enhancing the resistance of the floor 12 to its deformation caused by a side-on collision.

At the occurrence of a frontal collision, when an incoming collision load from the front side acts on the floor center member 20, the collision load works to bend the floor center member 20. Thus, a force is applied to a central part in the longitudinal direction of the floor center member 20 in a direction of bending the floor center member 20 upward. At this time, the floor center member 20 is caused to deform in a direction of separating from the first floor cross member 22. If the floor center member 20 and the first floor cross member 22 are coupled together firmly, however, such deformation of the floor center member 20 is suppressed, which is effective for enhancing the strength of the underbody structure 10.

Figure 2:
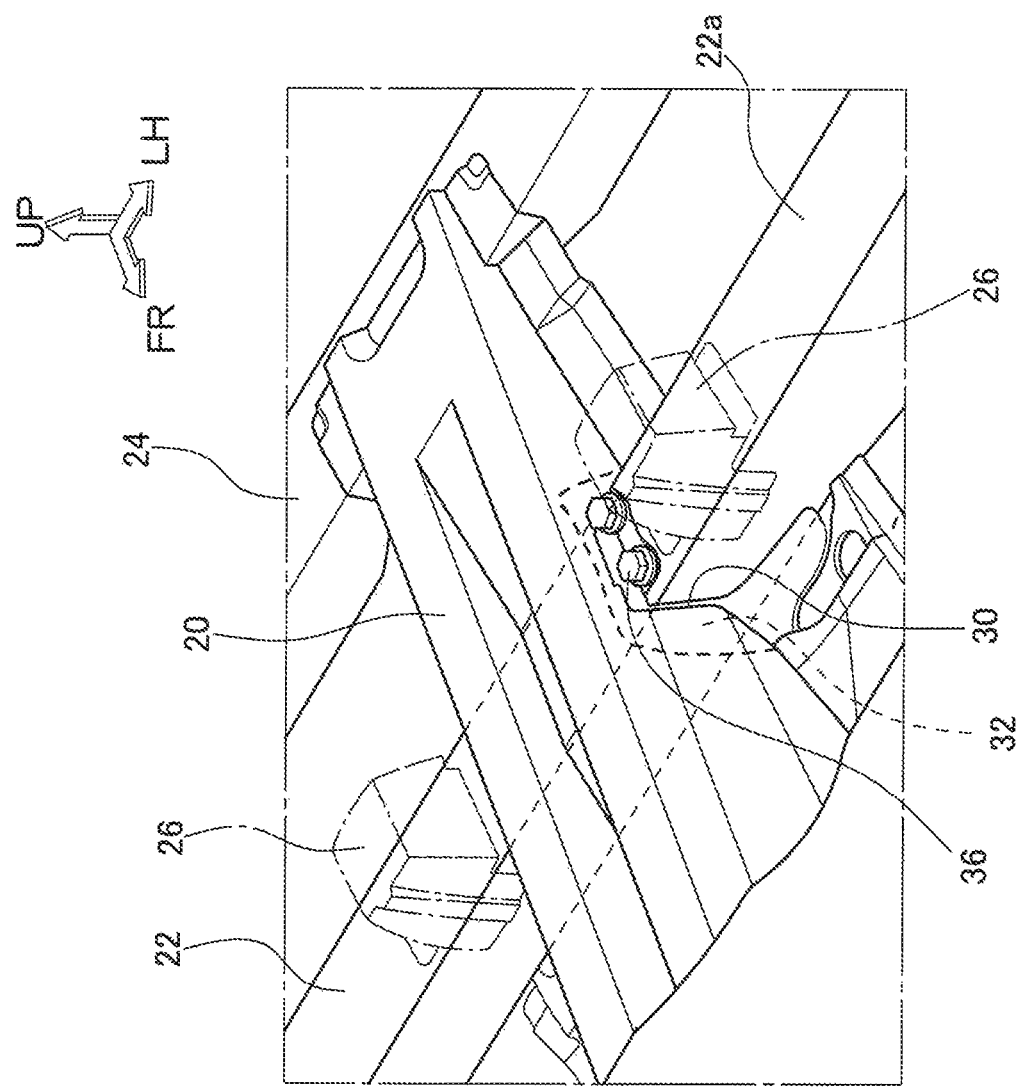
FIG. 2 is an enlarged perspective view of a cross part where a floor center member and a first floor cross member cross each other.
Figure 3:
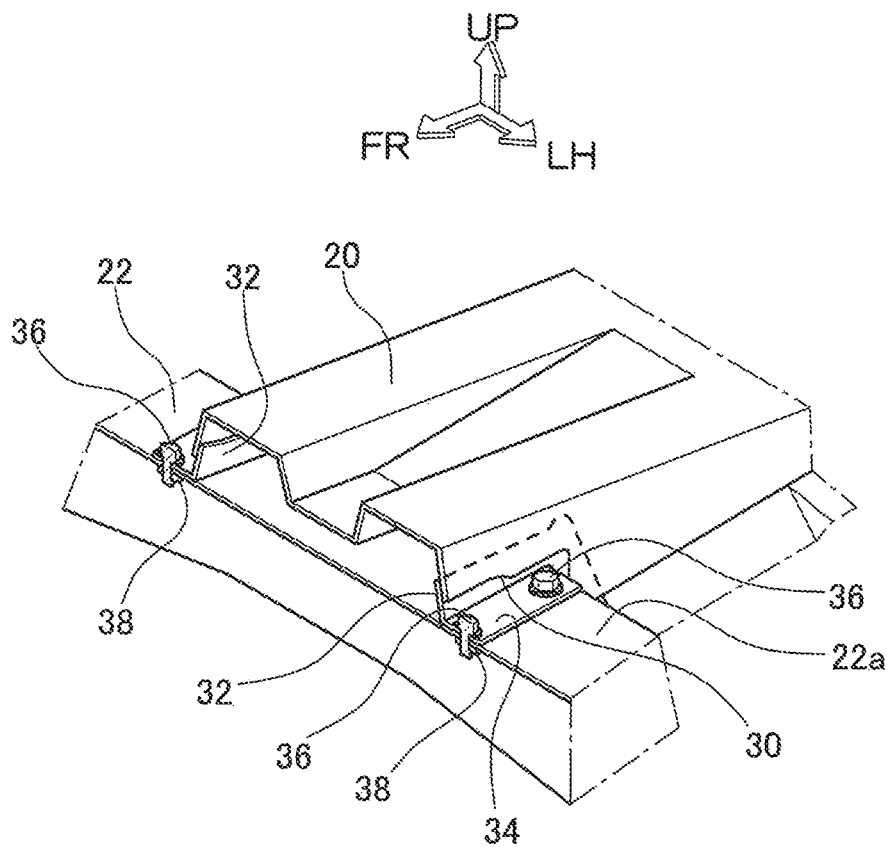
FIG. 3 is a perspective view showing the cross part of FIG. 2 in a partially broken form.
Figure 4:
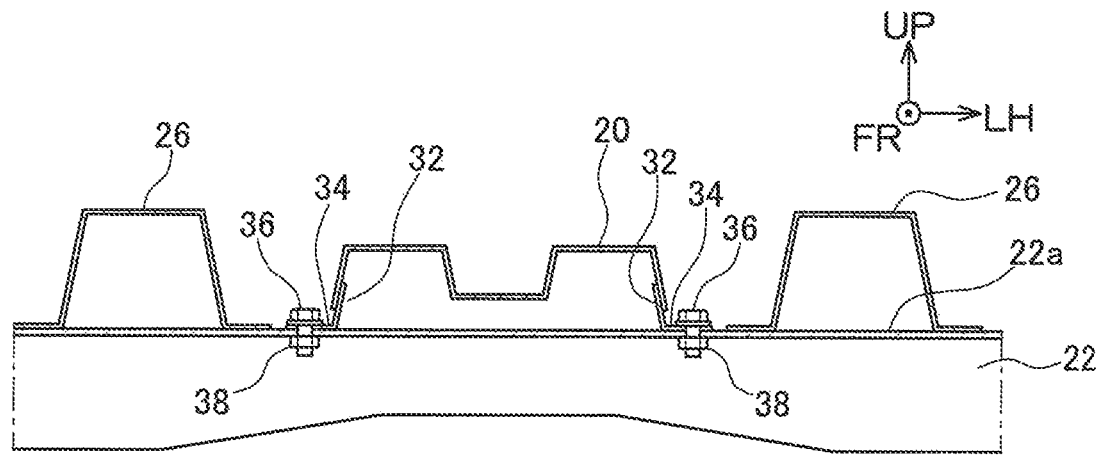
FIG. 4 is a side sectional view of the cross part of FIG. 2.

FIG. 2 is an enlarged perspective view of a cross part where the floor center member 20 and the first floor cross member 22 cross each other, FIG. 3 is a perspective view showing the cross part in a partially broken form, and FIG. 4 is a side sectional view of the cross part.

As mentioned above, the first floor cross member 22 penetrates the floor center member 20. On the floor center member 20, a side openings 30 are formed to allow the first floor cross member 22 to pass through the opening. Each side opening 30 is of an inverted U shape. To the periphery of the side opening 30, periphery reinforcing patches 32 are joined by welding or the like to serve as a part of the floor center member 20. On upper marginal parts of the side openings 30 of the floor center member 20, coupling flanges 34 are formed respectively such that the coupling flanges 34 are counter to a top wall 22a of the first floor cross member 22. In the underbody structure 10, the coupling flanges 34 are formed as a part of the periphery reinforcing patches 32.

The coupling flanges 34 are coupled to the top wall 22a of the first floor cross member, by bolts 36 and nuts 38; i.e., fastening components. The nuts 38 are located on the interior of the first floor cross member 22, being a closed sectional structure, and are screwed onto the bolts 36 inserted from outside into the interior of the first floor cross member 22. By coupling the floor center member 20 and the first floor cross member 22 together by the bolts 36 and the nuts 38, the floor center member 20 and the first floor cross member 22 are coupled more firmly.

The nuts 38 are provided as weld nuts welded and fixed to an inner wall surface of the top wall 22a of the first floor cross member. The nuts 38 are welded to the inner wall surface before the first floor cross member 22 is welded to the floor panel 14 to form the closed sectional structure. As a result, accessing the nuts 38 upon tightening the bolts 36 becomes unnecessary. It is therefore unnecessary to form an opening for accessing the nuts 38 on the floor panel 14.

Coupling points at which the floor center member 20 is coupled to the first floor cross member 22 by the bolts 36 and the nuts 38 are located inside relative to the seat anchor blocks 26 in the lateral direction of the vehicle. If the coupling points are located under the seat anchor blocks 26 or outside relative to the seat anchor blocks 26 in the lateral direction of the vehicle, it becomes necessary that the seat anchor blocks 26 be attached after the floor center member 20 is coupled to the first floor cross member 22. When the coupling points are located inside relative to the seat anchor blocks 26 in the lateral direction of the vehicle, on the other hand, no restrictions are imposed on the order of attachment of the seat anchor blocks 26 and coupling of the floor center member 20 to the first floor cross member 22. This increases a degree of freedom in constructing a vehicle assembling line.

In the above underbody structure 10, the coupling flange 34 is formed as a part of the periphery reinforcing patch 32. The coupling flange 34, however, may also be formed as a part of the first floor cross member. The floor center member 20 may be coupled to the first floor cross member 22 by not being fastened to the upper surface of the first floor cross member 22 but by being fastened to one or both side faces of the first floor cross member 22 or by being fastened to the upper surface and to one or both side faces as well. As the fastening components with which the floor center member is coupled to the first floor cross member, rivets may be used in place of the bolts and the nuts.

REFERENCE SIGNS LIST 10 underbody structure
12 body floor
14 floor panel
16, 18 rocker
20 floor center member
22 first floor cross member
24 second floor cross member
26 seat anchor block
28 dash panel
30 side opening
32 periphery reinforcing patch
34 coupling flange
36 bolt (fastening component)
38 nut (fastening component)

The invention claimed is:
1. An underbody structure of a vehicle, comprising:
a floor center member disposed on a body floor of the vehicle, the floor center member extending through a central part of the body floor and along a longitudinal direction of the vehicle; and a floor cross member disposed on the body floor of the vehicle, the floor cross member penetrating the floor center member to extend in a lateral direction of the vehicle, wherein the floor center member includes a coupling flange counter to a surface of the floor cross member, and the coupling flange is coupled to the floor cross member, by a fastening component.

2. The underbody structure of the vehicle according to claim 1, further comprising a seat anchor block disposed on a top face of the floor cross member, the seat anchor block to which a leg of a vehicle seat is fixed, wherein the floor center member is coupled to the floor cross member, by the fastening component, at a location that is inside relative to the seat anchor block in the lateral direction of the vehicle.

3. The underbody structure of the vehicle according to claim 1, wherein the fastening component includes a weld nut disposed on an inner surface of the floor cross member and a bolt that is screwed into the weld nut to couple the floor center member to the floor cross member.

4. The underbody structure of the vehicle according to claim 1, further comprising a pair of rockers, wherein the floor cross member includes a pair of ends, each of the pair of ends of the floor cross member is connected to a respective rocker of the pair of rockers.

5. The underbody structure of the vehicle according to claim 1, wherein the floor cross member penetrates the floor center member so as to extend through the floor cross member in the lateral direction.

6. The underbody structure of the vehicle according to claim 1, wherein the floor center member includes a pair of side openings, and the floor cross member extends through the side openings.

7. The underbody structure of the vehicle according to claim 6, wherein the coupling flange is positioned on an upper marginal part of one of the side openings.

\* \* \* \* \*